United States Patent [19]

Kagata et al.

[11] Patent Number: 4,776,441
[45] Date of Patent: Oct. 11, 1988

[54] FREE WHEEL HUB CLUTCH DEVICE

[75] Inventors: Tooru Kagata, Toyota; Hideaki Wakabayashi, Nagoya; Masayoshi Shiba, Anjo, all of Japan

[73] Assignee: Aisin Seiki Kabushiki Kaisha, Kariya, Japan

[21] Appl. No.: 942,729

[22] Filed: Dec. 17, 1986

[30] Foreign Application Priority Data

| Dec. 18, 1985 | [JP] | Japan | 60-284659 |
| Jan. 14, 1986 | [JP] | Japan | 61-3576 |
| Jan. 14, 1986 | [JP] | Japan | 61-3577[U] |
| Feb. 17, 1986 | [JP] | Japan | 61-21859[U] |
| Sep. 25, 1986 | [JP] | Japan | 61-147044[U] |

[51] Int. Cl.⁴ ............................................. B60K 23/08
[52] U.S. Cl. .............................. 192/0.02 R; 192/50; 192/67 R; 192/84 R; 192/93 A
[58] Field of Search ..................... 192/0.02 R, 20, 35, 192/40, 49, 50, 67 R, 84 R, 93 A; 403/1; 180/247

[56] References Cited

U.S. PATENT DOCUMENTS

| 3,123,169 | 3/1964 | Young et al. | 192/40 X |
| 4,007,820 | 2/1977 | Kagata | 192/67 R |
| 4,282,949 | 8/1981 | Kopich et al. | 192/67 R X |
| 4,534,455 | 8/1985 | Fujikawa | 192/40 |
| 4,627,512 | 12/1986 | Clohessy | 180/247 |

FOREIGN PATENT DOCUMENTS

51620  4/1984  Japan.

*Primary Examiner*—Leslie A. Braun
*Assistant Examiner*—Richard M. Lorence
*Attorney, Agent, or Firm*—Burns, Doane, Swecker & Mathis

[57] ABSTRACT

A free wheel hub clutch device includes a cylindrical body, an inner sleeve, a clutch member, a handle, a cam follower, a first tension spring, a second tension spring, a motor and a control. The control has an electrical charging apparatus and controls the motor which is attached to the free wheel hub clutch device. A sealing member is interposed between a wheel hub and an axle tube. With this construction, it is feasible to change from a two-wheel driving system to a four-wheel driving system and vice versa by manipulating a switch at the driver seat and further to prevent an outflow of grease from a bearing.

13 Claims, 10 Drawing Sheets

FREE WHEEL HUB CLUTCH DEVICE

BACKGROUND OF THE INVENTION

1. Field of the Invention

The present invention relates to a free wheel hub clutch device. More particularly, the present invention relates to a free wheel hub assembly disposed between an axle which is rotationally driven during only a four-wheel driving operation of a four-wheel drive car and to a wheel hub that the free wheel hub clutch device of the present invention connects to the axle permitting propagation of a driving force therebetween.

2. Description of the Prior Art

A conventional free wheel hub clutch device related to the present invention is disclosed, for instance, in the specification of Japanese Patent Laid-Open No. 51620/1984. This type of free wheel hub clutch device includes a cylindrical body fixed to an external end of a wheel rib rotatably fitted to an external end of an axle tube. An inner sleeve is linked to an external end projection of the axle inserted through the axle tube within the cylindrical body so as to permit propagation of a driving force. A clutch member is attached to the cylindrical body so that it is axially slidable and a handle is rotatably fitted to the cylindrical body. A cam follower is provided for causing the clutch member to engage with the inner sleeve by making the clutch member slide in the axial direction while interlocking with the handle. The arrangement is such that the propagation of the driving force becomes possible by manually turning the handle in order to cause the clutch member to mesh with the inner sleeve.

So far as the above-described prior art device is concerned, the handle is manually operated at the wheel to effect power conversion from a two-wheel driving system to a four-wheel driving system. Hence, it is required for the manipulator to go outside the vehicle. This requirement causes an inconvenience both to the operator on the occasion of terrible conditions both of weather and of the road.

Furthermore, the aforementioned conventional free wheel hub clutch device which employs a motor is attended with the following problems. Grease which is fully charged in a wheel bearing flows out therefrom and adheres to a slip ring serving as an electrical charging member for the motor and to a brush, thereby forming oil films. As a result, the motor is hindered from being charged with electricity, and further, sparks are generated to such an extent that the slip ring is damaged.

SUMMARY OF THE PRESENT INVENTION

It is a primary object of the present invention, which is inspired under the aforementioned circumstances and obviates the above-described problems, to provide a free wheel hub clutch device wherein: a motor is linked to a handle; the same device can readily be installed to an axle; the device is made compact and a power source is built in to thereby change over a driving wheel at the driver's seat; and grease of a wheel bearing is prevented from permeating into a cylindrical body.

To this end, according to one aspect of the present invention, there is provided a free wheel hub clutch device wherein the motor is incorporated in the cylindrical body. The motor, by which the handle is driven, is linked to the handle, and at the same time the motor is fitted to the side wall of the body.

According to another aspect of the present invention, there is provided a free wheel hub clutch device wherein: a slip ring is fixed to an axle tube and to one of wheel hubs; a brush disposed vis-a-vis with the slip ring is fixed to the axle tube and the other wheel hub; the slip ring or the brush which is fixed to the axle tube is connected to an electric power source; a terminal of the motor and a terminal of the brush or the slip ring are capable of being connected to each other by a one-touch operation when fixing the cylindrical body to the wheel hub.

According to still another aspect of the present invention, there is provided a free wheel hub clutch device wherein the handle is formed with a third gear engaging with a second gear so that reduction-rotation is carried out through the intermediary of a pinion gear, a first gear, projections of the first gear. The second gear is formed with holes into which the foregoing projections are inserted.

According to yet a further aspect of the present invention, there is provided a free wheel hub clutch device wherein a sealing member is interposed between the wheel hub and a seizing member for preventing the wheel bearing from being removed in the axial direction.

In such a construction, it is feasible to perform junction or non-junction of the axle and the wheel hub by operating the handle simply with the aid of a switch provided at the driver's seat and further to miniaturize the device because of the motor being built in the cylindrical body.

The slip ring and the brush are fixed to the axle tube and to the wheel hub. The motor is fitted to the side wall of the body. The brush and the slip ring which are fixed to the motor and to the wheel hub disposed vis-a-vis with the motor are equipped with terminals. Therefore, these terminals are adjusted to relative positions, such that linkage becomes possible by a one-touch operation. At these positions, the cylindrical body may be fixed to the wheel hub. Since the slip ring on the side of the axle tube or the brush is linked to the electric power source, when the electric power source is turned ON/OFF at the driver's seat, the motor is driven, so that a change over from a two-wheel driving system to a four-wheel driving system is accomplished by a turning of the handle.

The handle is reduction-driven through the intermediary of the gears by actuating the motor, and the junction of the axle and the wheel hub and the non-junction thereof can be done by the switch device.

Since the sealing member is interposed between the seizing member and the wheel hub, the grease filling the wheel bearing is prevented from permeating into the electrical charging member of the motor.

BRIEF DESCRIPTION OF THE DRAWINGS

These and other objects, features and advantages of the present invention will become more apparent on reading the following detailed description with reference to the accompanying drawings, wherein like members bear like reference numerals, and wherein:

FIGS. 1 to 4 in combination illustrate a first embodiment of the present invention;

FIGS. 5 to 8 in combination illustrate a second embodiment of the present invention;

FIGS. 9 to 12 in combination illustrate a third embodiment of the present invention;

FIGS. 13 and 14 illustrate a variation of the third embodiment of the present invention;

FIGS. 15 to 18 in combination illustrate a fourth embodiment of the present invention;

DETAILED DESCRIPTION OF THE PREFERRED EMBODIMENT

A first embodiment of the present invention will hereinafter be described with reference to FIGS. 1 to 4 inclusive. In a free wheel hub clutch device according to the present invention, a cylindrical body 1 is fixed by a bolt 3 to the external end of a wheel hub 32 which is rotatably installed on an external end of an axle tube 31. In the cylindrical body 1, a ring 4 is supportingly interposed between a plate 9, which is rotatably supported on the outer periphery of an inner sleeve 6 adjacent the ends of a plurality of splines 6a on the sleeve 6, and a pair of snap rings 5, one of which is held by the cylindrical body 1 and the other of which is supported in the ring 4. The inner sleeve 6 rotates integrally with an axle 33 and is rotatably supported by the ring 4. A handle 12 is rotatably supported by a bush 17 fitted to a boss 2a of a cover 2 attached to the cylindrical body 1 by the bolt 3. A cam surface 12b is formed on the circumference of a boss 12a of the handle 12. A cam follower 10 is incorporated in the outer periphery of the boss 12a of the handle 12 with a pawl 10a of the cam follower impinging upon the cam surface 12b.

Figure 1:
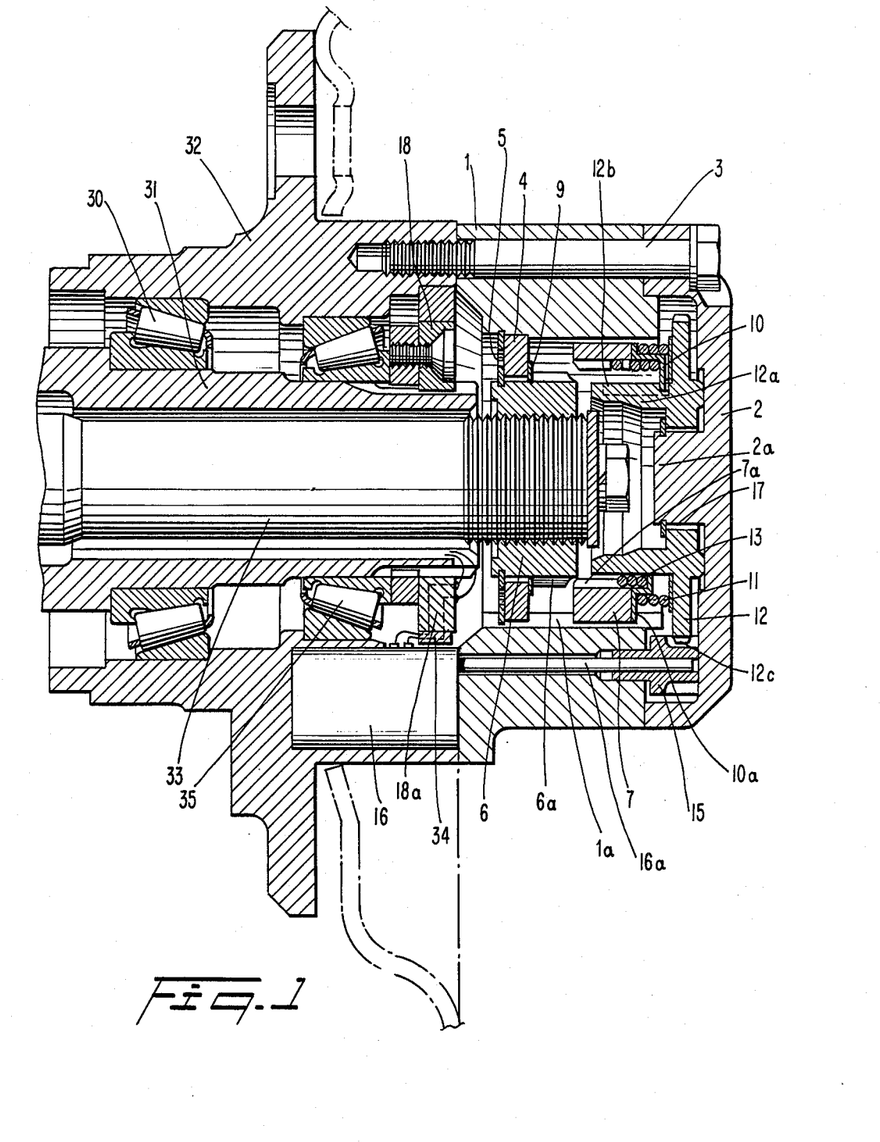
FIG. 1 is a cross-sectional view of a free wheel hub clutch device according to a first embodiment of the present invention.
Figure 2:
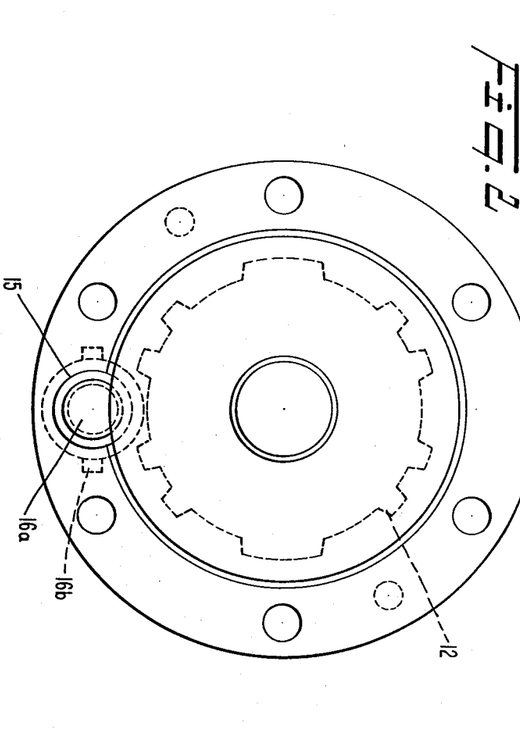
FIG. 2 is a front view of the embodiment of FIG. 1.
Figure 3:
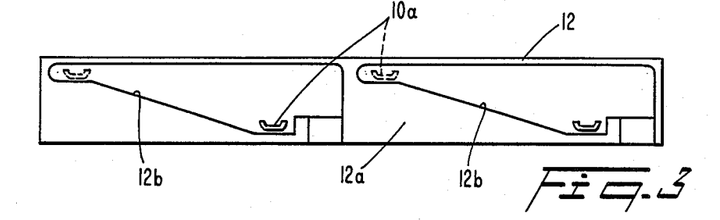
FIG. 3 is a view showing a profile of a cam surface of FIG. 1.
Figure 4:
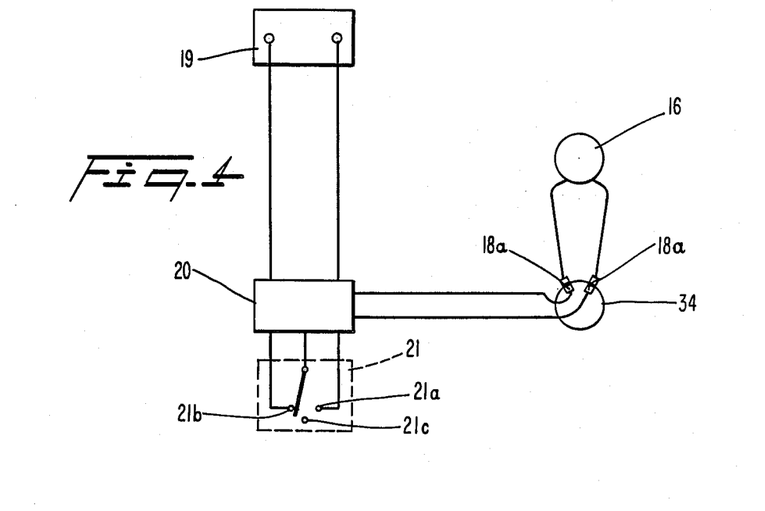
FIG. 4 is an electric circuit diagram for controlling the embodiment of FIG. 1.

A clutch member 7 is so provided as to impinge upon the cam follower 10. The clutch member 7 is installed so that it is axially slidable between its outer peripheral surface and the inner peripheral surface of the cylindrical body 1 while being prevented from rotating relative to the body 1 by splines 1a on the inner surface thereof. Tension springs 13, 11 are arranged to span between the clutch member 7 and the cam follower 10, and between the cam follower 10 and the handle 12, respectively. Splines 7a, 6a which are capable of engaging with each other are provided both on the inner peripheral surface of the clutch member 7 and on the outer peripheral surface of the inner sleeve 6.

A motor 16 including a shaft 16a provided in the side wall of the wheel hub 32 is fixed thereto in such a manner that the rotation of the motor 16 is stopped by projections 16b extending radially outwardly from the teeth of a pinion gear 15 provided on the shaft 16a (FIG. 2) which prevents meshing of the pinion gear 15 with a gear 12c. The gear 12c is provided on the outer periphery of the handle 12 normally mesh with the pinion gear 15. Although not all of the teeth are shown in the schematic illustration of FIG. 2, it will be understood that the gear is a conventional one having teeth equally spaced around the periphery thereof. The wheel hub 32 is equipped with a slip ring 34 linked to the motor 16. A brush 18a partly serving as a lock plate 18 of bearings 35 is fitted to the axle tube 31. The wiring for the motor 16 is arranged to extend from the brush 18a through the axle tube 31 to a control box 20 disposed within the car. The control box 20 (FIG. 4) communicates with an electric power source battery 19 and further with a switch 21 in the vicinity of the driver seat. The switch 21 has a three-point control system consisting of a forward rotation point 21a, a reversed rotation point 21b and a neutral point 21c.

When changing the switch 21 to the forward rotation point 21a from a state in which the clutch member 7 (as shown in FIG. 1) is separated from the inner sleeve 6, the motor 16 is charged with electricity through the intermediary of the slip ring 34, thereby rotating the shaft 16a in a first direction. Subsequently, the pinion gear 15 fitted to the shaft 16a is rotated in a first direction, and concomitantly the handle 12 engaging with the pinion gear 15 is rotated in a second direction opposite to the first direction. Immediately, the pawl 10a of the cam follower 10 moves (it shifts to the left in FIG. 1, and comes to the position indicated by a two-dot-chain line of FIG. 3); the clutch member 7 concomitantly moves in the same direction and engages with the inner sleeve 6, thereby making the four-wheel drive possible by linking the axle 33 to the wheel hub 32.

When it is desired that the clutch member 7 be disengaged from the inner sleeve 6, the switch 21 is changed to the reversed rotation point 21b, at which time the motor 16 is supplied with electricity through the slip ring 34. As a result, the shaft 16a rotates inversely, and the handle 12 is turned in the direction opposite to the direction of rotation of the shaft 16a. The pawl 10a of the cam follower 10 is biased in the axial direction (to the right in FIG. 1) along the cam surface 12b of the handle 12 with the force of the tension spring 11. However, a frictional force is created by torque between the clutch member 7 and the inner sleeve 6 and hence the pawl 10a comes to halt just when the force of the tension spring 11 equalizes with the force of the tension spring 13.

Thereafter, when the car moves, and cooperative rotation is made between the axle 33 and the wheel hub 32 cooperative rotation is also made between the inner sleeve 6 and the clutch member 7. When this occurs no frictional force between the inner sleeve 6 and the clutch member 7 is produced. The clutch member 7 moves in the axial direction (to the right in FIG. 1) under the urging of the tension springs 11, 13. Subsequently, the inner sleeve 6 is released from the engagement, thereby coming to the two-wheel driving state because of the other two wheels being rendered free.

When the switch 21 is set to the neutral point 21c, the motor 16 is brought into a non-electrical-charging state where either the four-wheel driving system or the two-wheel driving system is maintained.

A second embodiment of the present invention will hereinafter be described with reference to FIGS. 5 to 8 inclusive. As in the case of the first embodiment, the cylindrical body 1 is fixed together with the cover 2 by the bolt 3 to the external end of a wheel hub 32' which is rotatably installed on the external end of the axle tube 31. In the cylindrical body 1, the ring 4 is supportingly interposed between the plate 9 and the snap rings 5; the inner sleeve 6 which rotates integrally with the axle 33 is rotatably supported by the ring 4. The handle 12 is rotatably supported by the bush 17 fitted to the boss 2a of the cover 2 attached to the cylindrical body 1. The cam surface 12b is formed on the circumference of the boss 12a of the handle 12. The cam follower 10 is incorporated in the outer periphery of the boss 12a of the handle 12. The pawl 10a of the cam follower 10 impinges upon the cam surface 12b.

Figure 5:
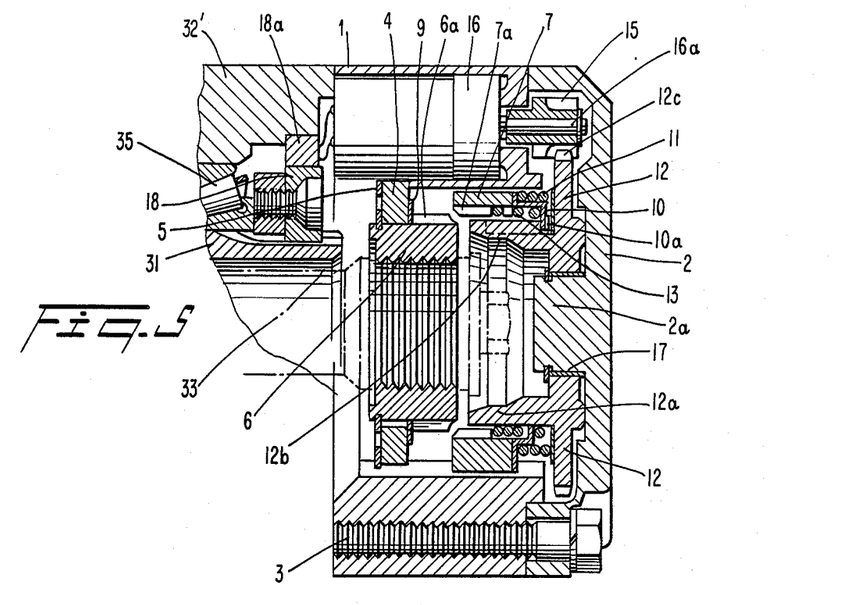
FIG. 5 is a partial cross-sectional view of the free wheel hub clutch device according to a second embodiment of the present invention.
Figure 6:
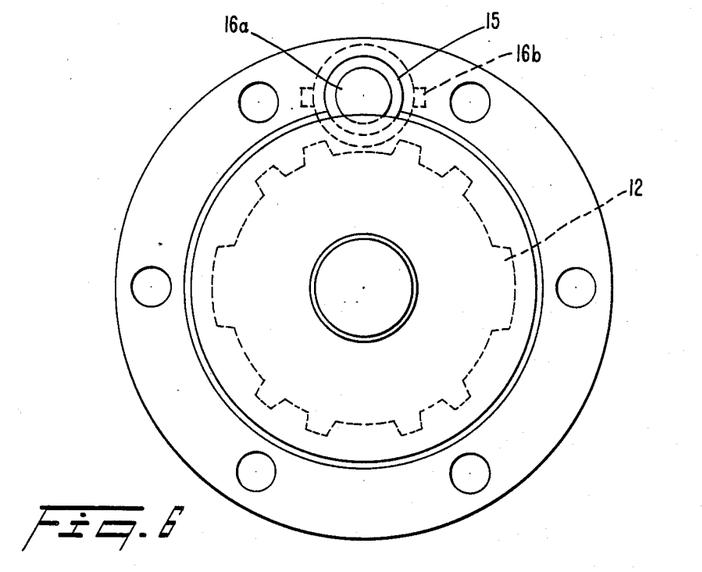
FIG. 6 is a front view of the embodiment of FIG. 5.
Figure 7:
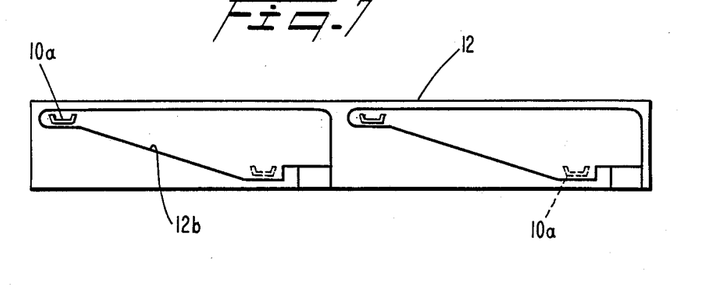
FIG. 7 is a view showing a profile of a cam surface of FIG. 5.
Figure 8:
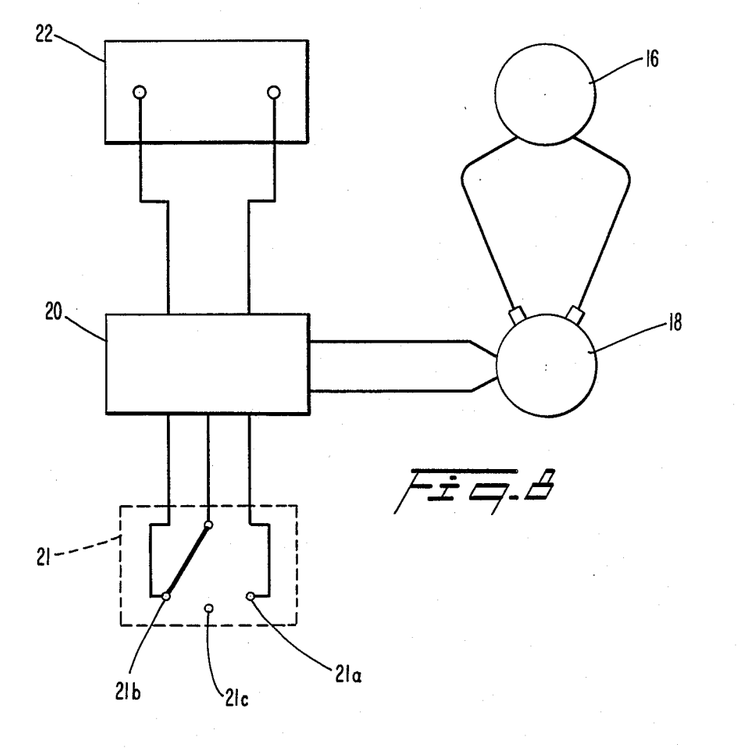
FIG. 8 is an electric circuit diagram for controlling the embodiment of FIG. 5.

The clutch member 7 is provided to impinge upon the cam follower 10. The clutch member 7 is installed so that it is axially slidable between its outer peripheral surface and the inner peripheral surface of the cylindrical body 1. The tension springs 13, 11 are arranged to span between the clutch member 7 and the cam follower 10, and between the cam follower and the handle 12, respectively. The splines 7a, 6a which are capable of engaging with each other are provided on the inner peripheral surface of the clutch member 7 and on the outer peripheral surface of the inner sleeve 6.

The motor 16 including the shaft 16a provided in the side wall of the cylindrical body 1 and is fixed in such a manner that the rotation thereof is stopped by projections 16b extending radially outwardly from the teeth of a pinion gear 15 provided on the shaft 16a (FIG. 6) which prevents meshing of the gear 15 with a gear 12c. The gear 12c is provided on the outer periphery of the handle 12 so as to normally mesh with the pinion gear 15. Although not all of the teeth are shown in the schematic illustration of FIG. 6, it is understood that the gear is a conventional one having teeth equally spaced around the periphery thereof. The wheel hub 32' is equipped with the brush 18a which is electrically connected to the motor 16; and the slip ring 18 is fitted to the axle tube 31. The slip ring 18 communicates both with the electric power source battery 22 and with the switch 21 in the vicinity of the driver's seat through the intermediary of the axle 33 and a control box 20 (FIG. 8) disposed within the car. The switch 21 has a three-point control system consisting of the forward rotation point 21a, a reversed rotation point 21b and a neutral point 21c.

When the switch 21 is changed to the forward rotation point 21a from a state where the clutch member 7 depicted in FIG. 5 is separated from the inner sleeve 6, the motor 16 is charged with electricity through the intermediary of the slip ring 18, thereby rotating the shaft 16a in a first direction. Subsequently, the handle 12 engaging with the pinion gear 15 is rotated in a second direction opposite to the first direction, at which time the pawl 10a of the cam follower 10 moves in the axial direction (it shifts to the left in FIG. 5, and comes to the position indicated by a two-dot-chain line in FIG. 7) along the cam surface 12b of the handle 12. As a result, the clutch member 7 likewise moves in the same direction and engages with the inner sleeve 6, thereby making the four-wheel drive possible by linking the axle 33 to the wheel hub 32'.

When it is desired that the clutch member 7 be disengaged from the inner sleeve 6, the switch 21 is changed to the reversed rotation point 21b, at which time the motor 16 is supplied with electricity through the slip ring 18. As a result, the shaft 16a rotates inversely, and the handle 12 is turned in the direction opposite to the direction of rotation of the shaft 16a. The pawl 10a of the cam follower 10 is biased in the axial direction (to the right in FIG. 5) along the cam surface 12b of the handle 12 with the force of the tension spring 11. However, a frictional force is created by torque between the clutch member 7 and the inner sleeve 6 and hence, the pawl 10a comes to a halt just when force at the tension spring 11 equalizes with the force of the tension spring 13.

Thereafter, as the car moves, and cooperative rotation is made between the axle 33 and the wheel hub 32', cooperative rotation is also made between the inner sleeve 6 and the clutch member 7. When this occurs, no frictional force between the inner sleeve 6 and the clutch member 7 is produced; and the clutch member 7 moves in the axial direction (to the right in FIG. 5) under the urging of the tension springs 11, 13. Subsequently, the clutch member 7 is separated from the inner sleeve 6, thereby coming to the two-wheel driving state on account of the two wheels being made free.

When the switch 21 is set to the neutral point 21c, the motor 16 is brought into a non-electrical-charging-state thereby to hold a state where either the four-wheel driving system or the two-wheel driving system is maintained.

A third embodiment of the present invention will hereinafter be described with reference to FIGS. 9 to 12. In a free wheel hub clutch device of the third embodiment, the cylindrical body 1 is fixed together with the cover 2 by the bolt 3 to the external end of the wheel hub 32" which is rotatably installed to the external end of the axle tube 31 through the intermediary of bearings 30, 35. In the cylindrical body 1, the ring 4 is supportingly interposed between the plate 9 and the snap rings 5; and the inner sleeve 6 which rotates integrally with the axle 33 is rotatably supported by the ring 4 and is further seized by the radially inner snap ring 5. The handle 12 is so fitted to the boss 2a of the cover 2 attached to the cylindrical body 1 as to be rotatably supported by the cover 2. The cam surface 12b is formed on the circumference of the boss 12a of the handle 12. The cam follower 10 is incorporated in the outer periphery of the boss 12a of the handle 12, the pawl 10a of the cam follower 10 impinges upon the cam surface 12b.

Figures 9, 10:
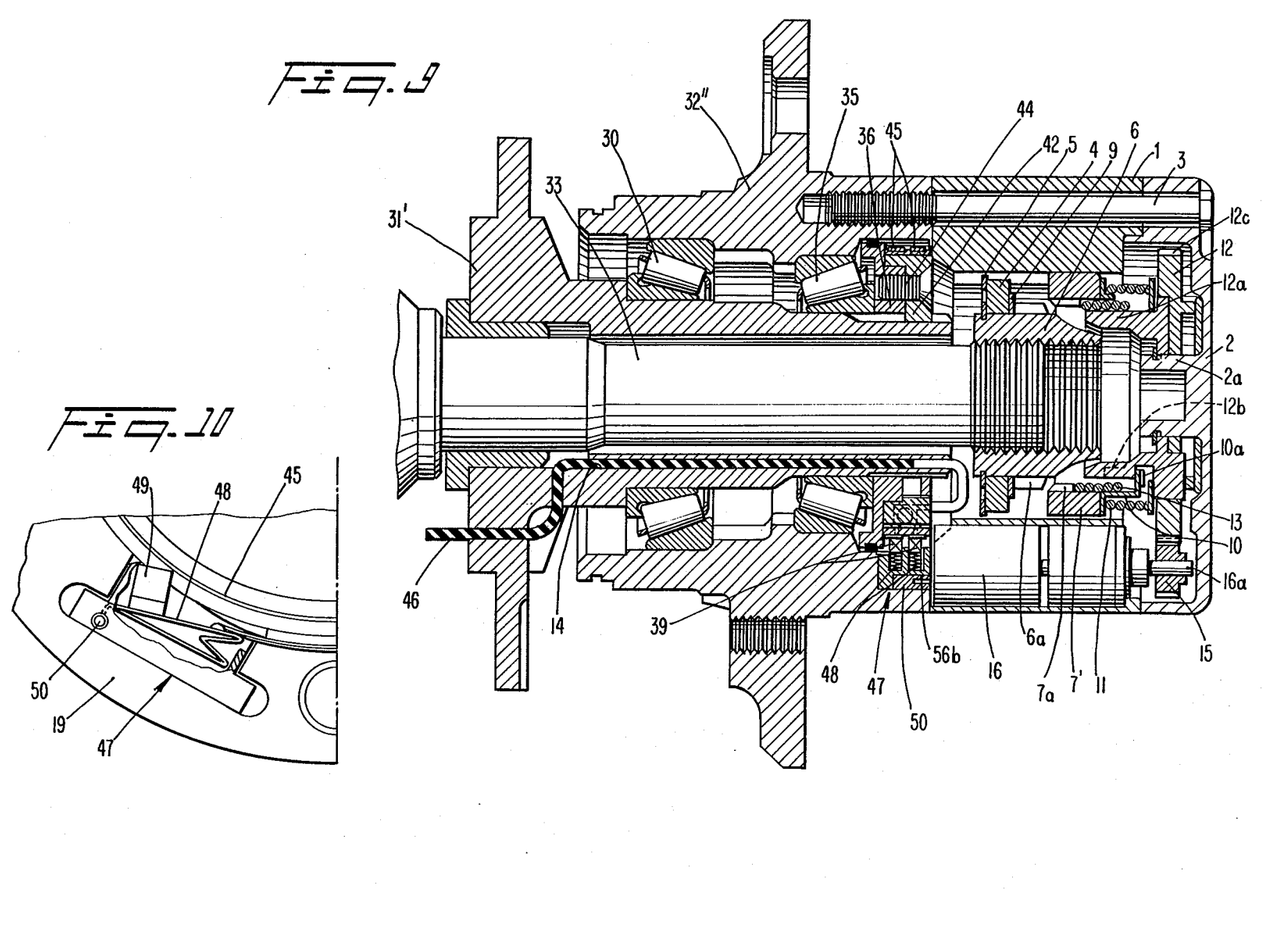
FIG. 9 is a cross-sectional view of a free wheel hub clutch device according to a third embodiment of the present invention.
FIG. 10 is a partial, front view of a brush box of FIG. 9.
Figure 11:
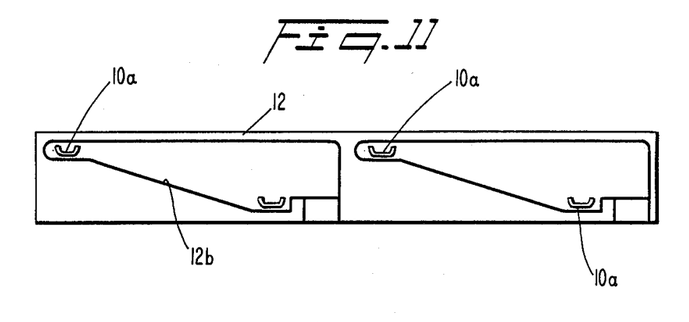
FIG. 11 is a view showing a profile of a cam surface of FIG. 9.

The clutch member 7 impinges upon the cam follower 10. The clutch member 7' is installed to be axially slidable, the arrangement being such that the outer peripheral surface thereof and the inner peripheral surface of the cylindrical body 1 are spline-joined. The tension springs 13, 11 are arranged to span between the clutch member 7 and the cam follower 10 and between the cam follower 10 and the handle 12, respectively. The splines 7a, 6a which are capable of engaging with each other are respectively provided both on the inner peripheral surface of the clutch member 7 and on the outer peripheral surface of the inner sleeve 6.

The motor 16 including the shaft 16a is fixed in the side wall of the body 1. The tip end of the shaft 16a is provided with the pinion gear 15. The gear 12c is provided on the outer periphery of the handle 12 so as to mesh with the pinion gear 15. A lock plate 42 and a lock nut 36 are secured to the end surface of the bearing 35 with a view to preventing the bearing 35 from being removed therefrom. The lock nut 36 is screwed to the axle tube 31'; the lock plate 32 is spline-joined to the axle tube 31'; and they are mutually joined by the bolt 44. Slip rings 45 are fixed to the outer periphery of a lock plate 42. The axle tube 31' is formed with a throughhole 14 in which an electric cord 46 is inserted.

Figure 12:
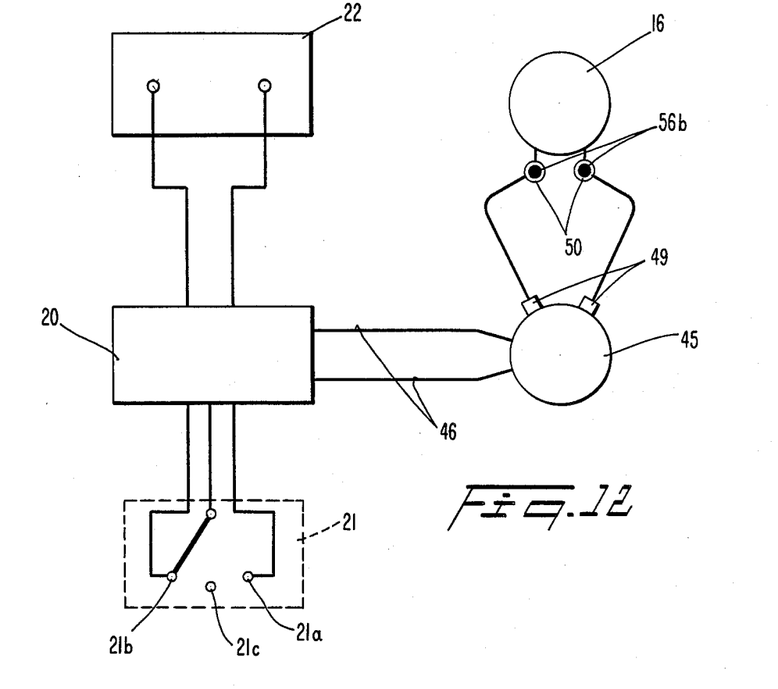
FIG. 12 is an electric circuit diagram for controlling the embodiment of FIG. 9.

One end of the electric cord 46 is connected from the external end of the axle tube 31' to terminals of the slip rings 45 of the lock plate 42, and the other end thereof passes to the control box 20 within the car and is then branched off to the electric power source 22 and to the switch 21 in the proximity of the driver's seat. The switch 21 has the three-point changing system consisting of the forward rotation point 21a, the reversed rotation point 21b and the neutral point 21c.

A brush box 47 is fixed to the wheel hub 32" disposed vis-a-vis with the slip rings 45. The brush box 47 houses springs 48. Brushes 49 are fitted to one end of the springs 48 which impinge upon the slip rings 45; and to the other ends thereof are connected concave terminals 50 in which convex terminals 56b of the motor 16 are fitted.

In the above-described construction (FIGS. 9-12) on the occasion of fastening the cylindrical body 1 of the free wheel hub clutch device to the wheel hub 32" with the bolt 3, the convex terminals 56b of the motor 16 are simply made to fit in the concave terminals 50 of the brush box 47, whereby the wiring extending from the motor 16 to the wheel hub 32" can be laid out by a one-touch operation.

The operation of the free wheel hub clutch device will be explained below.

When the switch 21 is changed to the forward rotation point 21a from a state where the clutch member 7 depicted in FIG. 9 is separated from the inner sleeve 6, the motor 16 is charged with electricity through the intermediary of the slip ring 45. As a result, the shaft 16a rotates in a first direction, and concomitantly the handle 12 engaging with the pinion gear 15 rotates in a second direction opposite to the first direction. Subsequently, the pawl 10a of the cam follower 10 moves in the axial direction (it shifts to the left in FIG. 9, and comes to the position indicated by the two-dot-chain line in FIG. 11) along the cam surface 12b of the handle 12. Thereupon, the clutch member 7 likewise moves in the same direction and engages with the inner sleeve 6, thereby making the four-wheel drive possible by linking the axle 33 to the wheel hub 32".

When it is desired that the above-described clutch member 7 be disengaged from the inner sleeve 6, the switch 21 is set to the reversed rotation point 21b, at which time the motor 16 is supplied with electricity. Consequently, the shaft 16a rotates inversely, and the handle 12 turns in the direction opposite to the direction of rotation of the shaft 16a. At this time, the frictional force is created between the clutch member 7 and the inner sleeve 6, and the pawl 10a of the cam follower 10 is biased in the axial direction (to the right in FIG. 9) along the cam surface 12b of the handle 12 with the force of the tension spring 11. However, the pawl 10a comes to a stop just when the force of the tension spring 11 equalizes the force of the tension spring 13.

Thereafter, when the car moves, cooperative rotation is made between the axle 33 and the wheel hub 32", thereby similarly making the cooperative rotation between the inner sleeve 6 and the clutch member 7. When this occurs, no frictional force between the inner sleeve 6 and the clutch member 7 is produced. The clutch member 7 therefore moves in the axial direction (to the right in FIG. 9) under the urging of the tension springs 11, 13, and is separated from the inner sleeve 6, thereby coming to the two-wheel driving state on account of the two wheels being made free.

When the switch 21 is set to the neutral point 21c, the motor 16 is brought into the non-electrically-charging state thereby to hold a state where either the four-wheel driving system or the two-wheel driving system is set by the previous operation.

Figure 13:
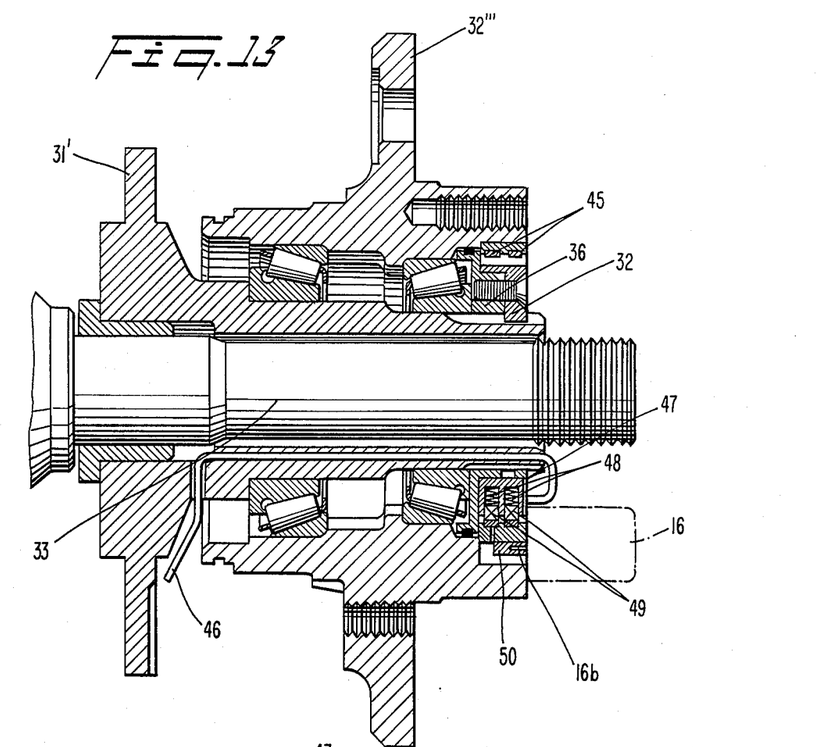
FIG. 13 is a partial cross-sectional view showing the variation of the third embodiment.
Figure 14:
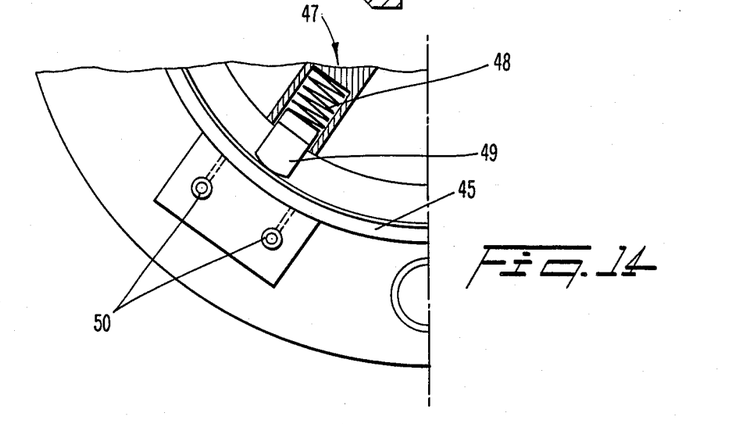
FIG. 14 is a partial, front view of the brush box of FIG. 13.

FIGS. 13 and 14 in combination show a variation of the third embodiment. The brush box 47 is fixed to the lock plate 42 of the axle tube 31', and the slip rings 45 are fixed to the wheel hub 32". The concave terminals 50 are linked to the slip rings 45, and the convex terminals 56b of the motor 16 are fitted therein. Other configurations and operations are the same as those of the third embodiment.

A fourth embodiment of the present invention will be described with reference to FIGS. 15 to 18 inclusive. In a free wheel hub clutch device of this embodiment, the cylindrical body 1 is fixed together with the cover 2 by the bolt 3 (not illustrated) to the external end of a wheel hub which is rotatably installed on the external end of an axle tube. In the aforementioned cylindrical body 1, the ring 4 is, on the outer periphery of the inner sleeve 6, supportingly sandwiched between the plate 9 and the snap rings 5, 8 (not illustrated).

Figure 15:
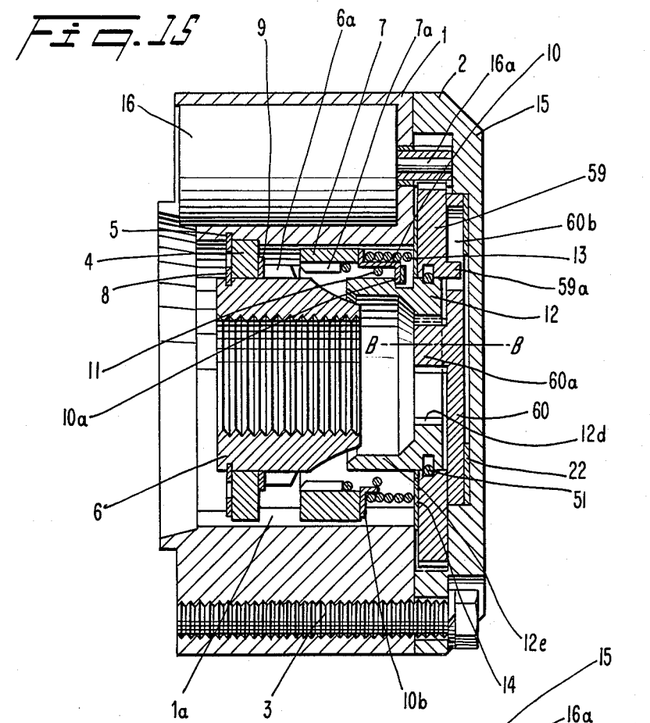
FIG. 15 is a cross-sectional view of the free wheel hub clutch device according to the fourth embodiment of the present invention.

The inner sleeve 6 is rotated integrally with the axle 33 and is rotatably supported by the ring 4. A handle 12 having a third gear 12d is hindered from being removed in the axial direction with the help of a snap ring 51 provided on the inner periphery of a first gear 59. This handle gear 12d is rotatably supported in this location. The cam surface 12b is formed on the circumference of a boss 12e of the handle 12. The cam follower 10 is incorporated in the outer periphery of the boss 12e of the handle 12. The pawl 10a impinges upon the cam surface 12b. The clutch member 7 is so provided as to impinge upon the cam follower 10. The clutch member 7 is installed such as to be axially slidable between the outer peripheral surface thereof and the inner peripheral surface of the cylindrical body 1.

The tension springs 13, 11 are arranged to span between the clutch member 7 and the cam follower 10 and between the cam follower 10 and the handle 12. The splines 7a, 6a which are capable of engaging with each other are respectively provided on the inner peripheral surface of the clutch member 7 and on the outer peripheral surface of the inner sleeve 6. The pinion gear 15 is axially seized at the tip end of the shaft 16a disposed in the side wall of the cylindrical body 1.

Figure 16:
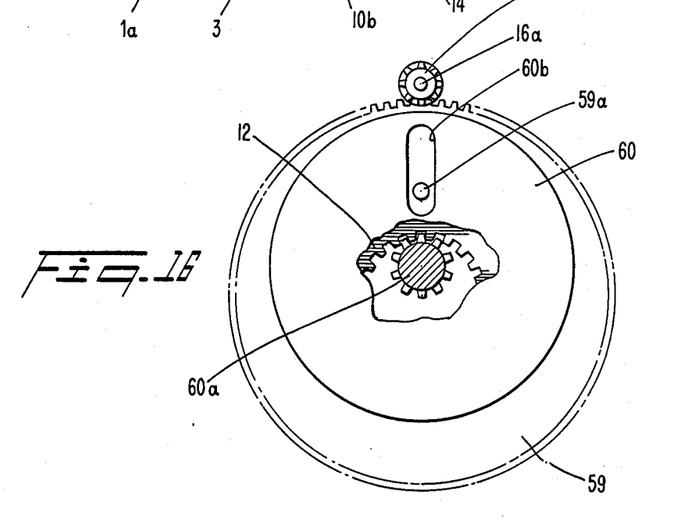
FIG. 16 is a front view, partially in detail, of an occurrence of engagement of gears of FIG. 15.
Figure 17:
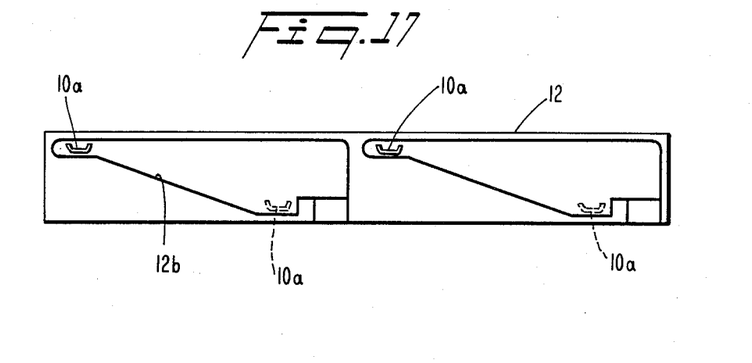
FIG. 17 is a view illustrating a profile of a cam surface of FIG. 15.
Figure 18:
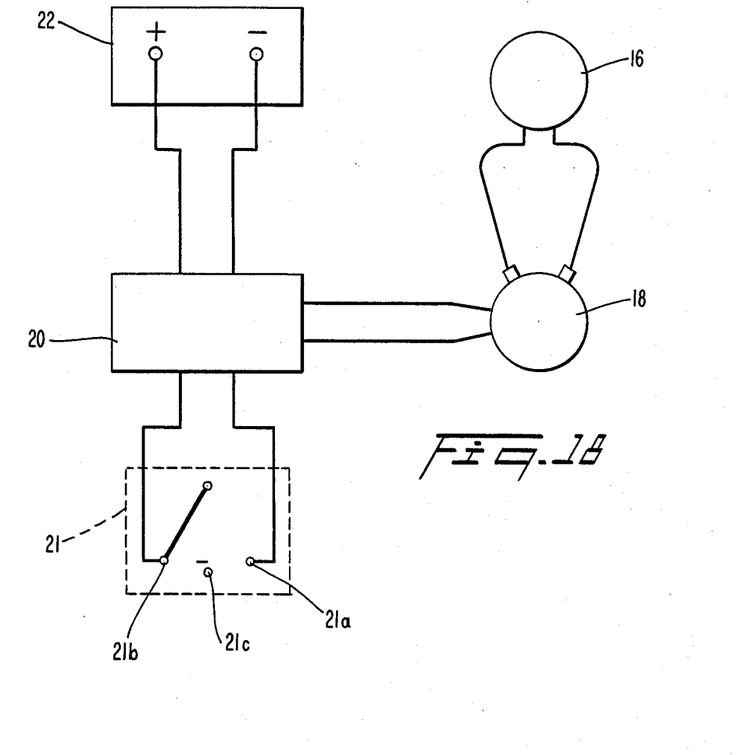
FIG. 18 is an electric circuit diagram for controlling the embodiment of FIG. 15.

The first gear 59 formed with teeth on its outer periphery engages with the pinion gear 15. A second gear 60 has a hole 60b in which a projection 59a jutting out on the side of the cover 2 is fitted. The hole 60b is notched in the radial direction. The projection 59a is formed on the inner periphery of the first gear 59; and the third gear 12d includes teeth on the inner periphery of the handle 12 which mesh with the teeth formed on the outer periphery of the projection that protrudes in the axial direction of the central portion of the second gear 60. The handle 12 is prevented from being removed by the snap ring 51 disposed between the outer periphery of the handle 12 and the inner periphery of the first gear 59. A washer 62 is interposed between the handle 12 and the cover 2, which arrangement fosters the rotation of the handle 12.

Referring to FIG. 15, the clutch member 7 is separated from the inner sleeve 6. The electric power is supplied from the battery 22 (FIG. 18) via the control box 20 having the switch 21 and the slip ring 18 (not illustrated in FIG. 15) to the motor 16, thereby rotating the shaft 16a. The switch 21 provided in the vicinity of the driver's seat has the three-point control system consisting of the forward rotation point 21a, the reversed rotation point 21b and the neutral point 21c.

In a state shown in FIG. 15, when the switch 21 is changed to the forward rotation point 21a, the motor is charged with electricity through the slip ring 18, thereby rotating the shaft 16a in a first direction. As a result, the pinion gear 15 which is axially seized by the shaft 16a is likewise rotated in the first direction. The first gear 59 which is in mesh with the pinion gear 15 concomitantly rotates in a second direction opposite the first direction, and the second gear 60 rotates along with the gear 15, with the axis B—B serving as the axial core, by virtue of a function of the projection 59a of the first gear 59. Subsequently, the handle 12 having the gear 12d meshing with the boss 60a of the second gear 60 rotates in the same direction as the pinion gear 15 and the second gear 6, and the pawl 10a of the cam follower 10 moves in the axial direction (it shifts to the left in FIG. 15, and comes to the position indicated by the two-dot-chain line in FIG. 17) along the cam surface 12b of the handle 12. Hence, the clutch member 7 moves in the same direction and engages with the inner sleeve 6, thereby making the four-wheel drive possible by linking the axle to the wheel hub.

When it is desired that the clutch member 7 be taken out of mesh with the inner sleeve 6, the switch 21 is set to the reversed rotation point 21b, at which time the motor is supplied with electricity through the slip ring 18. Accompanied with this process, the pinion gear 15 which is axially seized by the shaft 16a rotates in the second direction, and the handle 12 rotates in the first direction through the intermediary of the first and second gears 59, 60. The pawl 10a of the cam follower 10 is biased in the axial direction (to the right in FIG. 15) along the cam surface 12b of the handle 12 with the force of the tension spring 11. However, the frictional force is created by torque between the clutch member 7 and the inner sleeve 6, and the pawl 10a comes to halt just when the force of the tension spring 11 equalizes with the force of the tension spring 13.

Thereafter, when the car moves, and the cooperative rotation is made between the axle and the wheel hub, cooperative rotation is also made between the inner sleeve 6 and the clutch member 7. When this occurs, no frictional force between the inner sleeve 6 and the clutch member 7 is produced, and the clutch member 7 moves in the axial direction (to the right in FIG. 15) under the urging of the tension springs 11, 13. As a result, the inner sleeve 6 is released from the engagement, thereby coming to the two-wheel driving state because of the two wheels being rendered free.

When the switch 21 is changed to the neutral point 21c, the motor 16 is brought into the non-electrically-charging state thereby to hold a state where either the four-wheel driving system or the two-wheel driving system is maintained.

Figure 19:
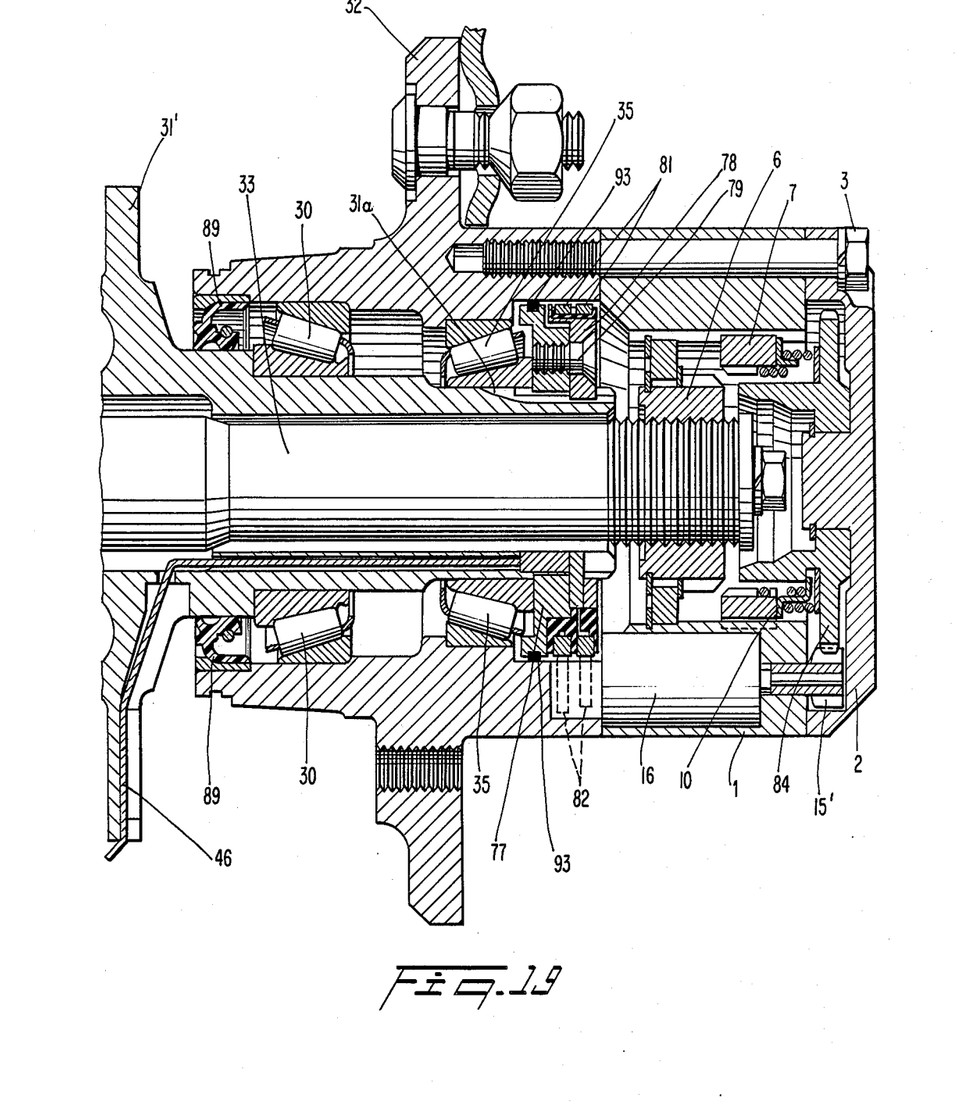
FIG. 19 is a cross-sectional view of a fifth embodiment of a free wheel hub clutch device according to the present invention.

A fifth embodiment of the present invention will hereinafter be described with reference to FIG. 19. In a free wheel hub clutch device of this embodiment, the body 1 is fixed together with the cover 2 by the bolt 3 to the external end of the wheel hub 32 which is rotatably installed through the wheel bearing 30 on the outer periphery of the axle tube 31'. On the side of the body 1, the wheel bearing 35 is provided with a nut (seizing member) 77 for preventing the wheel bearing from being removed by pressing the bearing 35. For the purpose of stopping its rotation, the nut 77 is fixed by a machine screw 79 through the intermediary of a plate 78 whose rotation is hindered by a groove 31a formed in the axle tube 31'. An O-ring 93 defined as the sealing member is interposed between the outer periphery of the nut 77 and the wheel hub 32 in order to prevent the grease filling the wheel bearing 30 from permeating in the body 1. The slip ring 81 is so fastened onto the outer periphery of the plate 78 as to rub on the brush 82. This brush 82 is connected to the motor 16 fixed to the body 1 so that the motor 16 can be charged with electricity.

The slip ring 81 is connected to a two-wheel/four-wheel change-over switch 21 provided at the driver's seat via a wiring within the axle 33 and to the battery in an engine room.

The shaft of the motor 16 is equipped with the pinion gear 15'. A reduction gear 84 rotatably installed through the cover 2 is fixed to an external end opening formed in the body 1 and is in mesh with the pinion gear 15'. The clutch member 7 which is slidably fitted in the axial direction to the body 1 interlocks with the reduction gear 84 through the cam follower 10, and is made to move in the axial direction through the gear 84 and the cam follower 10 under the urging of actuation of the motor 16, thereby releasing from the engagement with the inner sleeve 6.

A sealing member 89 is provided for preventing the grease filling the wheel bearing 30 from flowing out.

As can be clarified from the description so far made, the present invention yields the following favorable effects. Instead of manually operating the handle attached to the wheel to change from the two-wheel driving system to the four-wheel driving system, the motor is installed on the free wheel hub clutch device and hence it is feasible to effect the four-wheel drive by manipulating the switch provided at the driver seat, to perform the right-and-left simultaneous change-over operation, and to save more space in terms of construction. There is resultingly obtained an effect in which a mis-operation with respect to the change-over of a single wheel alone can be avoided.

The linkage of the wiring of the motor and the wheel hub can be done by simply joining the terminals to each other, this arrangement extremely facilitates the attachment to the wheel hub of the body.

The motor is provided on the side wall of the body, the power of which is propagated via the first and second gears to the third gear, thereby making it possible to change from the two-wheel drive to the four-wheel drive and vice versa.

The O-ring is interposed between the nut and the wheel hub. With this arrangement, it is possible to prevent the grease within the wheel bearing from permeating into the motor electrical charging members (slip ring and brush) and from adhering to the sli ring. Hence, the motor can stably be supplied with electricity, and the changing-over operation with respect to the driving system can be performed with stability. Furthermore, it is feasible to protect the slip ring from sparks so as not to be damaged.

The principles, preferred embodiments and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. A free wheel hub clutch device comprising:
   a cylindrical body having a first end connected to a wheel hub and a second end connected to a cover, said cylindrical body including an inner spline;
   an inner sleeve installed in said cylindrical body and fitted to a drive shaft extending through an axle tube, said inner sleeve including an outer spline;
   a slidable clutch member having an outer spline fitted to said inner spline of said cylindrical body and an inner spline selectively connectable to said outer spline of said inner sleeve;
   a handle including a cam surface and a handle sleeve which is rotatably supported by said cover;
   a cam follower having a first end formed with a pawl which slides on said cam surface and a second end which impinges upon said clutch member for causing the clutch member to slide, said cam follower being secured to said handle sleeve;
   a first tension spring arranged between said handle and said cam follower to bias the handle and cam follower toward one another;
   a second tension spring arranged between said cam follower and said clutch member to bias the cam follower and the clutch member toward one another;
   a motor fixed to the device including driving means comprising a motor shaft and a gear for selectively rotating said handle; and
   control means for controlling said motor.

2. The free wheel hub clutch device as set forth in claim 1, wherein said motor is fixed to said wheel hub.

3. The free wheel hub clutch device as set forth in claim 2, wherein said control means includes a first electrical contact fixed to said wheel hub and a second electrical contact fixed to said axle tube, one of said contacts being rotatable relative to the other contact, said control means being linked to said motor through said first and second contacts, an electric power source and an operation signal generating means.

4. The free wheel hub clutch device as set forth in claim 3, wherein said first and second contacts are formed from a slip ring and a brush.

5. The free wheel hub clutch device as set forth in claim 3, wherein said control means includes an electrical connector that passes through the axle tube and connects the control means with an electric power source, the control means communicating with the operation signal generating means.

6. The free wheel hub clutch device as set forth in claim 1, wherein said motor is fixed to said cylindrical body.

7. The free wheel hub clutch device as set forth in claim 6, wherein said control means is fixed to a wheel hub and to the axle tube and includes a relatively rotatable electrical connection means, said control means being linked to said motor, an electric power source and an operation signal generating means.

8. The free wheel hub clutch device as set forth in claim 7, wherein said electrical connection means has a slip ring on one side and has a brush on the other side.

9. The free wheel hub clutch device as set forth in claim 8, wherein said electrical connection means penetrates the axle tube and communicates with the electric power source and the operation signal generating means, and wherein said motor is connected to said electrical connection means by a plug connector including a socket on one end and a plug on the other end.

10. The free wheel hub clutch device as set forth in claim 8, wherein said electrical connection means penetrates the axle tube and communicates with the electric power source and the operation signal generating means.

11. The free wheel hub clutch device as set forth in claim 7, wherein said motor is connected to said electrical connection means by a plug connector including a socket on one end and a plug on the other end.

12. The free wheel hub clutch device as set forth in claim 7, wherein said handle includes: a first handle member having an inner gear on said handle sleeve, a second handle member having an eccentric outer gear engaging with said inner gear and a supportable member supported by said handle, and wherein said driving means includes a first gear fitted to a shaft of said motor, a second gear engaging with said first gear, and a driving member for driving said second handle member.

13. The free wheel hub clutch device as set forth in claim 7, wherein said electrical connection means is disposed in close proximity to a bearing which provides a rotatable support for said wheel hub, a sealing member being disposed in a radially formed space between said wheel hub and said axle tube to prevent an outflow of oil from said bearing.

* * * * *